(12) United States Patent
Arregui Torres et al.

(10) Patent No.: US 10,596,920 B2
(45) Date of Patent: Mar. 24, 2020

(54) VEHICLE CHARGING SYSTEM

(71) Applicant: Ford Global Technologies, LLC, Dearborn, MI (US)

(72) Inventors: Andrea Viviana Arregui Torres, Mexico City (MX); Gustavo Tovar Hernandez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 15/871,182

(22) Filed: Jan. 15, 2018

(65) Prior Publication Data

US 2019/0217718 A1 Jul. 18, 2019

(51) Int. Cl.
*B60L 53/65* (2019.01)
*B60L 53/12* (2019.01)
*B60L 53/30* (2019.01)
*B60L 53/35* (2019.01)

(52) U.S. Cl.
CPC .............. *B60L 53/65* (2019.02); *B60L 53/12* (2019.02); *B60L 53/305* (2019.02); *B60L 53/35* (2019.02)

(58) Field of Classification Search
CPC ........ B60L 53/65; B60L 53/35; B60L 53/305; B60L 53/12
USPC ...................................................... 320/109
See application file for complete search history.

(56) References Cited

U.S. PATENT DOCUMENTS

| | | | |
|---|---|---|---|
| 7,999,506 B1 | 8/2011 | Hollar et al. | |
| 8,473,131 B2 | 6/2013 | Leary | |
| 8,946,938 B2* | 2/2015 | Kesler | H03H 7/40 307/104 |
| 9,266,440 B2 | 2/2016 | Gao et al. | |
| 9,276,416 B2* | 3/2016 | Kroenke | H02J 7/0021 |
| 9,770,993 B2 | 9/2017 | Zhao et al. | |
| 9,969,289 B2* | 5/2018 | Mu | H02J 7/00 |
| 2011/0106336 A1* | 5/2011 | Eikeland | B60L 50/66 701/2 |
| 2011/0246252 A1* | 10/2011 | Uesugi | B60L 3/12 705/7.12 |
| 2012/0005125 A1* | 1/2012 | Jammer | G06Q 10/04 705/412 |
| 2012/0007542 A1* | 1/2012 | Jammer | B60L 53/53 320/101 |
| 2012/0116575 A1* | 5/2012 | Prosser | G06Q 20/202 700/232 |
| 2013/0346025 A1* | 12/2013 | Schulz | B60L 53/60 702/182 |
| 2015/0032516 A1* | 1/2015 | Deshpande | G06Q 50/06 705/13 |

(Continued)

*Primary Examiner* — M Baye Diao
(74) *Attorney, Agent, or Firm* — David B. Kelley; Brooks Kushman P.C.

(57) ABSTRACT

Parking infrastructure includes a charger disposed beneath parking spaces that provides charge to batteries for each of a plurality of vehicles, and a control module. The control module is configured to, in response to vehicle charge requests that includes routine data from each vehicle controller associated with each vehicle, connect the charger to each vehicle associated with each request based on a queue organized by a threshold sufficient to complete a routine from the routine data for each vehicle, and, in response to exceeding the threshold for each vehicle, check the queue for additional charge requests.

7 Claims, 2 Drawing Sheets

(56) References Cited

U.S. PATENT DOCUMENTS

2016/0380440 A1* 12/2016 Coleman, Jr. ............ G05F 1/66
          700/295
2018/0009323 A1*  1/2018 Liang ................ B60L 11/1822

* cited by examiner

VEHICLE CHARGING SYSTEM

TECHNICAL FIELD

The present disclosure relates to a charging system for a wireless charging station in a parking area.

BACKGROUND

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery that stores electrical power for powering the electric machine. The battery may be recharged by regenerative braking, an internal combustion engine, an electric grid ("plugging in"), or other means of energy harvesting, such as photovoltaics.

Charging stations typically are connected to an electric grid infrastructure to charge a battery of an electric vehicle prior to use. The lack of supporting infrastructure to charge and refuel creates a barrier to electric vehicle adoption.

SUMMARY

A charging system includes a charging station disposed beneath a surface including indicia to separate spaces to park vehicles. The charging station is configured to provide charge to each vehicle battery for each of the vehicles. The charging system also includes a control module. The control module is configured to, in response to vehicle charge requests that includes routine data from a vehicle controller, connect the charging station to each vehicle associated with each request based on a queue organized by a threshold sufficient to complete a routine from the routine data for each vehicle, and, in response to exceeding the threshold for each vehicle, check the queue for additional charge requests from the vehicle controller.

A control method includes, by a controller, in response to charge requests from each vehicle within an area, including routine data from each vehicle controller, connect a charging station to each vehicle associated with each request based on a queue organized by a threshold sufficient to complete a routine from the routine data of each vehicle. The control method also includes, by a controller, in response to exceeding the threshold for each vehicle, check the queue for additional charge requests.

Parking infrastructure includes a charger disposed beneath parking spaces that provides charge to batteries for each of a plurality of vehicles, and a control module. The control module is configured to, in response to vehicle charge requests that includes routine data from each vehicle controller associated with each vehicle, connect the charger to each vehicle associated with each request based on a queue organized by a threshold sufficient to complete a routine from the routine data for each vehicle, and, in response to exceeding the threshold for each vehicle, check the queue for additional charge requests.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Some vehicles such as plug-in hybrid electric vehicles (PHEV) and battery electric vehicles (BEV) may include a vehicle traction battery configured to supply electric power to a traction motor. The traction battery, traction motor, and other components cooperate as an electric drive system. In a BEV the electric drive system may be the only source of propulsive power to vehicle traction wheels, while a PHEV may additionally be provided with an internal combustion engine. Such vehicles may be connected to an external power supply to recharge the traction battery when the vehicle is parked.

A charging system having a wireless charging station may be provided to wirelessly charge the vehicles, account for misalignment, and may be provided with logic to facilitate the efficient wireless charging between multiple vehicles. The charging system may account for variation in vehicle size, vehicle type, and vehicle parking space position. The vehicle charging system may also be able to detect the presence of a vehicle within a parking space and the arresting of vehicle movement within the parking space.

Figure 1:
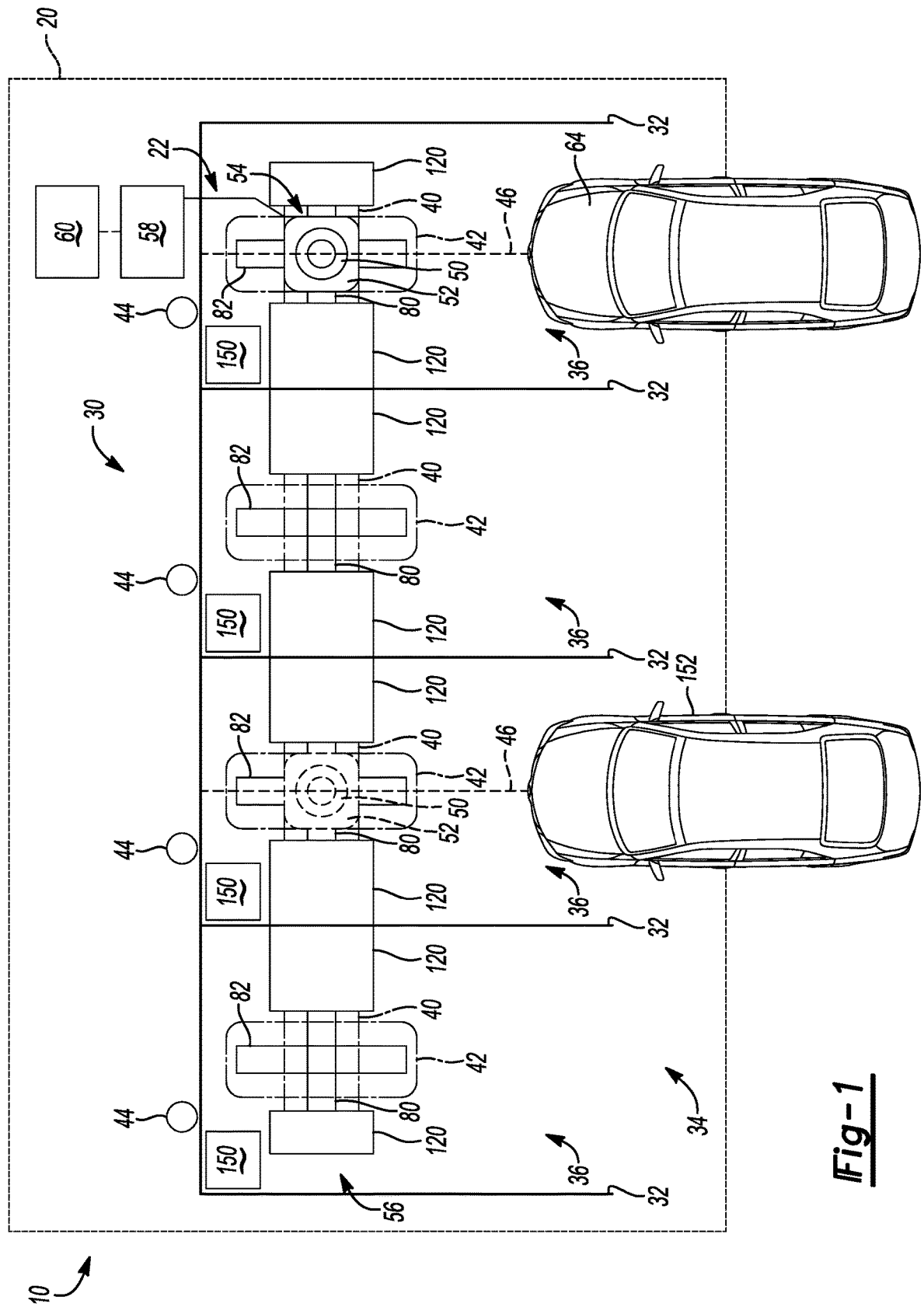
FIG. 1 is a plan view of a parking area having a multiple vehicle wireless charging station for a charging system.

Referring to FIG. 1 a vehicle charging system 10 is shown. The vehicle charging system 10 may be located in a parking lot, a parking structure, or the like. The vehicle charging system 10 may be configured to share a common wireless charging point between multiple vehicles and maximize the power transfer efficiency. The vehicle charging system 10 may include a parking area 20 and a wireless charging station 22.

The parking area 20 may define an area intended for the parking of multiple vehicles. The parking area 20 may include a surface 30 that may be a durable or semi-durable surface such as concrete, asphalt, wood, or other materials that may provide a surface for vehicle parking. In at least one embodiment, the parking area 20 may be a concrete slab having indicia 32 disposed on or within the surface 30. The indicia 32 may define a plurality of or multiple automotive vehicle parking spots 34 and may be referred to as parking spot indicia. The indicia 32 may be markers or dividers defining the limits of a parking spot 36 of the multiple automotive vehicle parking spots 34. The markers may be painted lines defining the lateral extents or a width of the parking spot 36. The markers may also include an abutment, such as a concrete abutment, defining the longitudinal extent or a length of the parking spot 36.

The parking area 20 may include a first channel 40 and a second channel 42. The first channel 40 may be a lateral channel extending laterally across the multiple automotive vehicle parking spots 34. In at least one embodiment, the first channel 40 may be a generally arcuate channel arcing or curving across the multiple automotive vehicle parking spots 34. The first channel 40 may extend below the surface 30 such that the first channel 40 is disposed beneath the parking area 20. The first channel 40 may be disposed substantially perpendicular with respect to the indicia 32. In at least one embodiment, the first channel 40 may be disposed substantially parallel to and spaced apart from the abutment defining the longitudinal extent of the parking spot 36.

The second channel 42 may be a longitudinal channel extending longitudinally within each parking spot 36. The second channel 42 may be disposed between corresponding parking spot indicia 32. The second channel 42 may extend below the surface 30 such that the second channel 42 is disposed beneath the parking area 20. The second channel 42 may intersect the first channel 40. The second channel 42 may be disposed substantially perpendicular to the first channel 40. The second channel 42 may be disposed substantially parallel to and spaced apart from the indicia 32. In at least one embodiment, the second channel 42 may be disposed substantially perpendicular to and spaced apart from the abutment defining the longitudinal extent of the parking spot 36.

A visual indicator 44 may be disposed on the parking area 20. The visual indicator 44 may extend from the surface 30 and may be offset from a centerline 46 of the parking spot 36. The visual indicator 44 may be spaced apart from the first channel 40 and the second channel 42. The visual indicator 44 may be placed directly in front of a driver's seat to minimize parallax error that may arise if the visual indicator 44 is placed directly in front of the centerline 46. The visual indicator 44 may provide a visual target to the driver of the vehicle to aid the driver in aligning the vehicle with the wireless charging station 22. In at least one embodiment, a wheel stop or a recess 48 may be defined by the parking area 20. The recess 48 may be disposed between the first channel 40 and the indicia 32. The recess 48 may extend below the surface 30. The recess 48 may be configured to receive a vehicle wheel to set a vehicle longitudinal position within a parking spot 36 of the multiple automotive vehicle parking spots 34.

The wireless charging station 22 may at least partially be disposed beneath the surface 30 of the parking area 20. The wireless charging station 22 may include a primary charge coil 50, a movable head 52, a mechanical conveyor system 54, a plate assembly 56, and a control module 58.

The primary charge coil 50 may be a source coil configured to transfer power from a power source 60 to a vehicle mounted coil, a receiving coil, or a secondary coil 62. A high voltage wire or cable may extend from the primary charge coil 50 to the power source 60. The secondary coil 62 may be disposed on the underbody or underside of a vehicle 64 that may enter a parking spot 36 of the multiple automotive vehicle parking spots 34. The secondary coil 62 may be in communication with a vehicle mounted controller 66 and/or power electronics operatively connected to a vehicle mounted battery 68. The transfer power from the power source 60 to the secondary coil 62 may charge (increase the state of charge) of the vehicle mounted battery 68.

The primary charge coil 50 may be mounted on the movable head 52. The combination of the primary charge coil 50 and the movable head at 52 may define a movable charging head. The movable head 52 may include a coil supporting structure 72, a lift mechanism 74, and a mounting plate 76. The coil supporting structure 72 may be configured to support the weight of the primary charge coil 50. The lift mechanism 74 may be disposed on the mounting plate 76 and may extend between the coil supporting structure 72 and the mounting plate 76. The lift mechanism 74 may be configured to translate the movable charging head towards or away from the secondary coil 62. The lift mechanism 74 may be configured as a screw drive system, a scissor lift, a belt lift mechanism, a hydraulic lift, or the like. The translation imparted by the lift mechanism 74 may be configured to adjust an air gap to achieve an optimal air gap between the primary charge coil 50 and the secondary coil 62. The adjustment of the air gap may improve the efficiency of wireless power transfer between the primary charge coil 50 and the secondary coil 62. The air gap may be based on a predetermined charge rate arbitrated between the control module 58 and the vehicle mounted controller 66, and the vehicle charging system capacity based on voltage and current. The air gap may be further based on a height of the secondary coil 62 above the surface 30 of the parking area 20.

The movable charging head may be configured to pivot and/or translate the primary charge coil 50 with respect to the first channel 40, the second channel 42, and/or the secondary coil 62. The translation of the primary charge coil 50 along the first channel 40 may laterally position the primary charge coil 50 relative to the secondary coil 62. The translation of the primary charge coil 50 along the second channel 42 may longitudinally position the primary charge coil 50 relative to the secondary coil 62. The translation of the primary charge coil 50 along the second channel 42 may adjust for misalignment of the primary charge coil 50 with the secondary coil 62 along a vehicle longitudinal axis or the centerline 46 of the parking spot 36. The closer the alignment between the primary charge coil 50 and the secondary coil 62, the better the efficiency of wireless power transfer.

The movable charging head may be mounted on the mechanical conveyor system 54. In at least one embodiment, the wireless charging station 22 may be at least partially disposed on the mechanical conveyor system 54. The mechanical conveyor system 54 may be configured to move or translate the combination of the primary charge coil 50 and the movable head 52 within the first channel 40 across and between the multiple automotive vehicle parking spots 34. The mechanical conveyor system 54 may be configured to move or translate the combination of the primary charge coil 50 and the movable head 52 within the second channel 42 across a length of a parking spot 36 of the multiple automotive vehicle parking spots 34.

The wireless charging station 22 may be in communication with or under the control of the control module 58. The control module 58 may control the movable charging head to translate the primary charge coil 50 across and between the multiple automotive vehicle parking spots 34 and within a parking spot 36. The control module 58 may include multiple controllers that operate in conjunction to control various components of the vehicle charging system 10. The control module 58 may be software embedded a controller or may be a separate hardware device. The control module 58 may include at least one microprocessor or central processing unit (CPU) in communication with various types of computer readable storage devices or media. Computer readable storage devices or media may include volatile and nonvolatile storage in read-only memory (ROM), randomaccess memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control module in controlling the wireless charging station 22.

The control module 58 may communicate with the plurality of sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The control module 58 may further communicate with other controllers over a hardline connection using a common bus protocol (e.g., CAN), and may also employ wireless communication.

The control module 58 may be in communication with the primary charge coil 50, the power source 60, the secondary coil 62, the vehicle mounted controller 66, and the battery 68. The control module 58 may receive signals indicative of a vehicle having a secondary coil entering a parking spot 36 of the multiple automotive vehicle parking spots 34. The control module 58 may receive signals indicative of the battery state of charge level of a vehicle having a secondary coil entering a parking spot 36 of the plurality of automotive parking spots 34.

As stated previously, the control module 58 may receive a signal indicative of the vehicle 64 entering a parking spot 36 of the multiple automotive vehicle parking spots 34. The signal indicative of the vehicle 64 entering a parking spot 36 of the multiple automotive vehicle parking spots 34 may be provided by a proximity sensor 150. The proximity sensor 150 may also be configured to provide a signal indicative of the vehicle 64 coming to a stop within a parking spot 36 of the multiple automotive vehicle parking spots 34. The proximity sensor 150 may be disposed proximate the parking area 20. In at least one embodiment, the proximity sensor 150 may be disposed beneath the surface 30 of the parking area 20.

The proximity sensor 150 may be an inductive loop embedded within the parking area 20. The proximity sensor 150 may be at least one of an ultrasonic sensor, a radar, a light detection and ranging (LIDAR) device, radio detection and ranging (RADAR) device, laser scanner, or a combination thereof. The number, type, and positioning of the proximity sensor 150 may vary based on the implementation of the vehicle charging system 10.

The control module 58 may be configured to operate the movable charging head across and between the multiple automotive vehicle parking spots 34 and within a parking spot 36 of the multiple automotive vehicle parking spots 34. The control module 58 may be programmed, in response to the proximity sensor 150 providing a signal indicative of the vehicle 64 entering the parking spot 36 and to a signal indicative of the vehicle 64 coming to a stop within the parking spot 36, to translate the movable charging head along at least one of the first channel 40 and the second channel 42. The movable charging head may be operated to position the primary charge coil 50 relative to the secondary coil to charge the vehicle 64.

The movable charging head may be translated along the first channel 40 to laterally position the primary charge coil 50 relative to the secondary coil 62. The movable charging head may also be translated along the second channel 42 to longitudinally position the primary charge coil 50 relative to the secondary coil 62. For example, the control module 58 may translate the primary charge coil 50 of the movable charging head along the second channel 42 in response to a misalignment between the primary charge coil 50 and the secondary coil 62 along a vehicle longitudinal axis or a centerline 46 of a parking spot 36 of the multiple automotive vehicle parking spots 34. In at least one embodiment, the movable charging head may translate vertically to adjust an air gap between the primary charge coil 50 and the secondary coil 62. Stated differently, the control module 58 automates connecting the primary and secondary coils 50, 62 to charge the vehicle mounted battery 66.

The control module 58 may be provided with control logic configured to determine a charging order of vehicles parked on the parking area 20. The charging order may be a queue indicative of which vehicle will be charged by the wireless charging station 22. As will be explained in more detail below, the queue may be based on a charge time required to charge a vehicle battery to exceed a threshold to complete a stored, or planned routine of the vehicle. The queue, therefore, allows the charging system 10 to manage charge times for electric vehicles parked within the parking area 20 such that each vehicle 64 within the parking area 20 is supplied with sufficient energy required for a daily routine, or, alternatively or additionally with a manually entered destination, or routine. Additionally or alternatively, the charging order may be updated when the proximity sensor 150 senses a presence of a further parked vehicle 152. The charging order may, likewise, be updated wirelessly and in real-time. Managing charge times for vehicles 64, 152 parked within a parking area 20 allows for efficient charging of parked vehicles 64, 152. For example, by optimizing the charging order based on vehicle usage, the charging system 10 allows for a maximum number of vehicles to be sufficiently charged while in the parking area 20.

Figure 2:
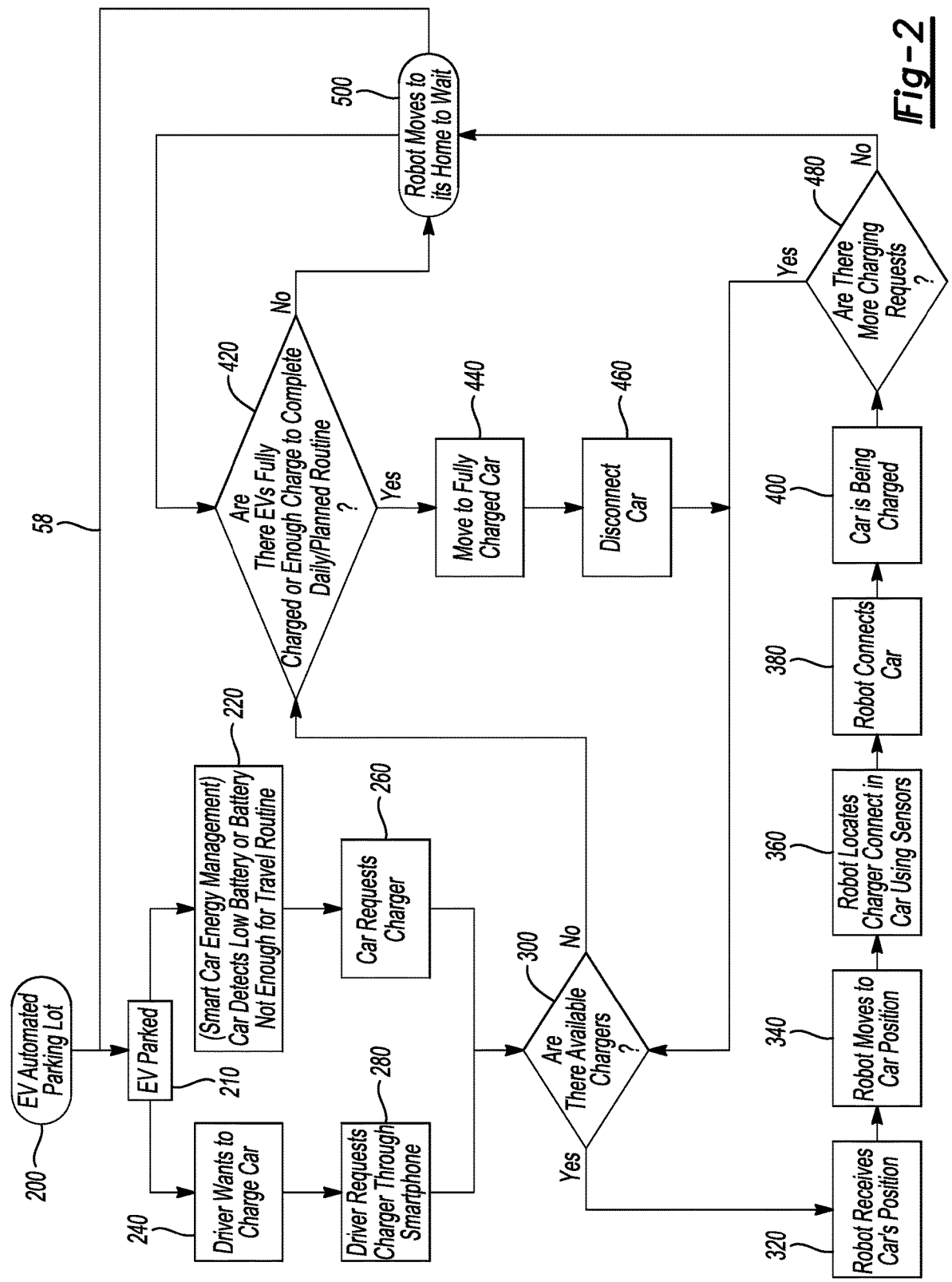
FIG. 2 is a control logic flowchart for the charging system.

FIG. 2 depicts a process flowchart of the control logic for the control module 58 of the wireless charging station 22 within the charging system 10. The control logic for the control module 58 of the wireless charging station 22 begins at 200, wherein the parking area 20 is an EV automated parking area. As stated above, the control logic for the control module 58 may allow for optimization and management of charging electric vehicles. As will be described in more detail below, the control logic of the control module 58 of the wireless charging station 22 manages charging of multiple vehicles within the parking area 20 based on planned routines and daily activities of each of the different vehicles 64, 152 within the parking area 20.

At 210, the control module 58 determines whether an electric vehicle 64 is parked within the parking area 20. The control module 58 identifies vehicles 64, 152 within the parking area 20 using the proximity sensor 150 such that, at 210, the control module 58 identifies a parked vehicle 64 within the parking area 20. At 220, the vehicle mounted controller 66, via an energy management system, may detect that the vehicle mounted battery 68 does not have sufficient charge for a planned routine for the vehicle 64 parked within the parking area 20, which may be entered manually by a driver or calculated based on a daily routine of the driver by the vehicle controller 66. If, at 220, the vehicle mounted controller 66 determines an insufficient battery charge for a planned routine, the vehicle mounted controller 66 may communicate with the control module 58 at 260 to request a wireless charging station 22. Separately or simultaneously to the vehicle mounted controller requesting a wireless charging station at 260, a driver (not shown) may manually request charging of the vehicle 64 at 240. At 240, the control module 58 may receive a signal indicating a driver's desire to charge the vehicle mounted battery 68. At 280, the driver may request a wireless charging station 22 via a smart phone app such as, for example, an energy management system coupled with a smartphone.

At 300, the control module 58 determines an availability of the wireless charging stations 22. If at 300 wireless charging stations 22 are available, the control module 58 receives data via the proximity sensor 150 of the vehicle's position at 320. At 340, the control module 58 instructs the wireless charging station 22 to move to the position of the vehicle from the data received at 320. At 360, the control module 58 communications the vehicle mounted controller 64 to move the wireless charging station 22 including the primary charge coil 50, the movable had 52, the mechanical conveyor system 54, and the plate assembly 56 toward the secondary coil 62 using sensors as described above, for example. Additionally, the charging station 22 may utilize several different EV connectors to accommodate various parking area sizes. At 380, the control module 58 connects the wireless charging station 22 to the vehicle, and at 400, the control module 58 verifies that the vehicle 64 is being charged.

If at 300, no wireless charging stations are available, the control module 58 communicates with the vehicle mounted controller 66 to determine if the vehicles 64 are fully charged or have sufficient charge to complete a planned routine at 420. For example, the control module 58 may receive routine data from the vehicle mounted controller 66 that is indicative of a manually entered routine, or a routine determined based on usage of the vehicle 64. The routine data may be entered manually with a vehicle navigation system, or calculated by the vehicle navigation based on vehicle usage.

The control module 58 compares, at 420, whether the vehicle mounted battery 68 has a sufficient charge to complete the routine. At 420, the control module 58 determines, from the comparison of a current charge of the vehicle mounted battery 66 and the routine, a threshold charge level to complete the routine. If at 420, the control module 58 determines the vehicle 64 is fully charged, or has sufficient charge to complete the routine such that the vehicle mounted battery 68 has a charge level exceeding a threshold associated with a charge level needed to complete the routine, the control module 58 moves to the fully charged car at 440. At 460, the control module 58 disconnects the wireless charging station 22 from the vehicle 64. Once disconnected, the control module returns to checking for available wireless charging stations 22 at 300.

Returning to 400, once the vehicle 64 is being charged, the control module 58 determines if there are any more charging requests at 480. For example, at 480, the control module 58 may receive multiple charge requests from multiple vehicles parked 64, 152 within the parking area 20. At 480, if the control module receives multiple charge request, the control module 58 may generate a queue. The queue orders and organizes the charge requests for each vehicle based on the threshold. For example, if a first vehicle mounted controller 66 sends routine data and a charge level to the control module 58 and the control module determines the first vehicle 64 has sufficient charge that exceeds the threshold, the control module 58 moves the first vehicle to the lowest priority.

Likewise, if a second charge request and routine data are present at 480 in addition to the charge request for the first vehicle 64, and the control module 58 determines that a charge level of a vehicle mounted battery 68 for a second vehicle 152 is below a threshold to complete a routine for the second vehicle 152, the control modules moves the second vehicle 152 ahead of the first vehicle 64 in the queue. The queue may only be limited by a number of spots 34 in the parking area 20. Therefore, the control module 58 may be configured to organize the queue based on each individual threshold for each electric vehicle at 480 within the parking area 20. The control module 58 uses the queue, and the associated requests for charging, the control module to determine available charging stations 22 at 300 to charge vehicles based on the queue.

If at 480, the control module 58 determines that there are no remaining charging requests in the queue, the control module 58 moves the wireless charging station 22 to a home location at 500. Similarly, if, at 420, the control module 58 determines that each vehicle 64 is fully charged or has sufficient charge to complete a daily planned routine such that a charge level of the vehicle mounted battery 66 for each vehicle 64 exceeds a threshold calculated from routine data from a navigation system of each vehicle to complete the routine for each vehicle, the control module 58 moves the wireless charging station 22 to a home location at 500, and awaits further charge requests.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A charging system comprising:
a charging station disposed beneath a surface that includes indicia to separate spaces for parking; and
a control module configured to,
receive from each of a plurality of vehicles parked in the spaces a desired charge level and data defining a driving routine to be completed by the vehicle,
determine for each of the plurality a threshold charge level to complete the driving routine,
determine for each of the plurality whether a current charge level is less than the threshold charge level,
order the plurality in a queue according to whether the respective current charge levels are greater than the respective threshold charge levels such that vehicles of the plurality having the current charge level less than the threshold charge level are higher in order than vehicles of the plurality having the current charge level greater than the threshold charge level, and
charge via the charging station each of the plurality having the current charge level less than the threshold charge level in the order defined by the queue to the desired charge level such that vehicles of the plurality having the current charge level greater than the threshold charge level are not charged via the charging station.

2. The charging system as claimed in claim 1, wherein the control module is further configured to, in response to completion of the queue, move the charging station to a home.

3. The charging system as claimed in claim 1, wherein the control module is configured to, in response to detecting a parked vehicle via a proximity sensor, initiate communication with the vehicle controller to determine a charge request.

4. The charging system as claimed in claim 1, wherein the charge request is sent via a smartphone.

5. A control method comprising:
by a controller,
receiving from each of a plurality of vehicles a desired charge level and data defining a driving routine to be completed by the vehicle,
determining for each of the plurality a threshold charge level to complete the driving routine,
determining for each of the plurality whether a current charge level is less than the threshold charge level,
ordering the plurality in a queue according to whether the respective current charge levels are greater than the respective threshold charge levels such that vehicles of the plurality having the current charge level less than the threshold charge level are higher in order than vehicles of the plurality having the current charge level greater than the threshold charge level, and
charging via a charging station each of the plurality according to the queue such that vehicles of the plurality having the current charge level less than the threshold charge level are charged to the corresponding respective desired charge levels before vehicles of the plurality having the current charge level greater than the threshold charge level are charged to the corresponding respective charge levels.

6. The control method as claimed in claim 5 further comprising, in response to completion of the queue, move the charging station to a home.

7. The control method as claimed in claim 5 further comprising, in response to detecting a parked vehicle via a proximity sensor, initiate communication with a controller of the parked vehicle.

\* \* \* \* \*